United States Patent
Kosen

(10) Patent No.: US 10,324,631 B2
(45) Date of Patent: Jun. 18, 2019

(54) CONTROL APPARATUS, STORAGE APPARATUS AND METHOD

(71) Applicant: FUJITSU LIMITED, Kawasaki-shi, Kanagawa (JP)

(72) Inventor: Tadashi Kosen, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 15/787,351

(22) Filed: Oct. 18, 2017

(65) Prior Publication Data

US 2018/0136852 A1   May 17, 2018

(30) Foreign Application Priority Data

Nov. 11, 2016   (JP) ................................. 2016-220838

(51) Int. Cl.
  *G06F 12/00* (2006.01)
  *G06F 13/00* (2006.01)
  *G06F 3/06* (2006.01)

(52) U.S. Cl.
  CPC .......... *G06F 3/0611* (2013.01); *G06F 3/0647* (2013.01); *G06F 3/0665* (2013.01); *G06F 3/0689* (2013.01)

(58) Field of Classification Search
  CPC .... G06F 3/0611; G06F 3/0647; G06F 3/0665; G06F 3/0689
  USPC ........................................................ 711/114
  See application file for complete search history.

(56) References Cited

U.S. PATENT DOCUMENTS

| 7,809,906 | B2 * | 10/2010 | Eguchi ..................... G06F 3/061 710/15 |
| 2006/0288176 | A1 * | 12/2006 | Morishita ............. G06F 3/0607 711/161 |
| 2007/0050588 | A1 * | 3/2007 | Tabata .................. G06F 3/0608 711/165 |
| 2007/0220208 | A1 | 9/2007 | Nomura et al. |
| 2008/0104343 | A1 * | 5/2008 | Miyagaki .............. G06F 3/0613 711/158 |

(Continued)

FOREIGN PATENT DOCUMENTS

| JP | 2000-187608 | 7/2000 |
| JP | 2006-31367 | 2/2006 |

(Continued)

*Primary Examiner* — Sheng Jen Tsai
(74) *Attorney, Agent, or Firm* — Staas & Halsey LLP

(57) ABSTRACT

A control apparatus configured to determine a first value indicating a resource amount of a first storage apparatus, determine, respectively for a plurality of logical volumes included in the first storage apparatus, a load of the first storage apparatus due to access from an information processing apparatus, determine a priority of the plurality of logical volumes, respectively, for a process of data migration from a second storage apparatus to the first storage apparatus, determine a second value indicating a resource amount of the first storage apparatus which is used in the access from the information processing apparatus to the first storage apparatus, calculate, as a migration resource amount of the first storage apparatus, a value by subtracting the second value from the first value, allocate the migration resource amount to the plurality of logical volumes based on the priority respectively determined for the plurality of logical volumes.

20 Claims, 13 Drawing Sheets

(56) References Cited

U.S. PATENT DOCUMENTS

| | | | |
|---|---|---|---|
| 2009/0150639 A1* | 6/2009 | Ohata | G06F 3/0608 |
| | | | 711/172 |
| 2011/0060878 A1* | 3/2011 | Kaneko | G06F 3/061 |
| | | | 711/114 |
| 2012/0079226 A1* | 3/2012 | Kihara | G06F 3/0665 |
| | | | 711/165 |
| 2013/0073820 A1* | 3/2013 | Watanabe | G06F 3/0611 |
| | | | 711/162 |
| 2013/0132641 A1* | 5/2013 | Suzuki | G06F 12/0246 |
| | | | 711/103 |
| 2014/0359215 A1* | 12/2014 | Ogihara | G06F 3/0611 |
| | | | 711/114 |
| 2015/0248245 A1* | 9/2015 | Sakata | G06F 3/06 |
| | | | 711/5 |
| 2015/0356078 A1* | 12/2015 | Kishimoto | G06F 16/119 |
| | | | 707/610 |
| 2016/0011983 A1 | 1/2016 | Inoue | |
| 2016/0054947 A1* | 2/2016 | Liu | G06F 3/0634 |
| | | | 711/170 |
| 2016/0085750 A1* | 3/2016 | Taketa | G06F 16/113 |
| | | | 707/737 |
| 2017/0308316 A1* | 10/2017 | Yamamoto | G06F 3/0664 |

FOREIGN PATENT DOCUMENTS

| | | |
|---|---|---|
| JP | 2007-249457 | 9/2007 |
| JP | 2014-232348 | 12/2014 |
| JP | 2016-21271 | 2/2016 |

* cited by examiner

FIG. 6

| LBA\LUN | LBA0 | LBA1 | LBA2 | ... | LBAn-1 | LBAn | ACCESS COUNT PER LUN |
|---|---|---|---|---|---|---|---|
| LUN0 | 0 | 20 | 15 | ... | 0 | 0 | 150 |
| LUN1 | 0 | 0 | 1 | ... | 0 | 0 | 50 |
| LUN2 | 0 | 1 | 0 | ... | 0 | 0 | 5 |
| LUN3 | 0 | 0 | 1 | ... | 0 | 0 | 10 |
| ... | ... | ... | ... | ... | ... | ... | ... |
| LUNn-1 | 0 | 0 | 0 | ... | 0 | 0 | 0 |
| LUNn | 3 | 0 | 0 | ... | 0 | 0 | 15 |

| LUN | POINT |
|---|---|
| LUN0 | 4 |
| LUN1 | 3 |
| LUN2 | 1 |
| LUN3 | 0 |
| LUN4 | 0 |
| ⋮ | ⋮ |
| LUN n-1 | 0 |
| LUNn | 1 |
| TOTAL POINT OF ALL LUNS | 20 |

| LBA\LUN | LBA0 | LBA1 | LBA2 | LBA3 | ... | LBAn-1 | LBAn |
|---|---|---|---|---|---|---|---|
| LUN0 | 0 | 1 | 1 | 0 | ... | 0 | 0 |
| LUN1 | 1 | 0 | 1 | 1 | ... | 0 | 0 |
| LUN2 | 0 | 1 | 0 | 0 | ... | 0 | 0 |
| ⋮ | ⋮ | ⋮ | ⋮ | ⋮ | ... | ⋮ | ⋮ |
| LUNn-1 | 0 | 0 | 0 | 0 | ... | 0 | 0 |
| LUNn | 0 | 0 | 1 | 0 | ... | 0 | 0 |

CONTROL APPARATUS, STORAGE APPARATUS AND METHOD

CROSS-REFERENCE TO RELATED APPLICATION

This application is based upon and claims the benefit of priority of the prior Japanese Patent Application No. 2016-220838, filed on Nov. 11, 2016, the entire contents of which are incorporated herein by reference.

FIELD

The embodiments discussed herein are related to a control apparatus, a storage apparatus and a method.

BACKGROUND

For a storage system including a plurality of storage apparatuses, there is a data migration technique of migrating data from one storage apparatus to another storage apparatus. Data migration is executed by a controller module (a storage control unit) provided in a new storage apparatus (a storage apparatus of a data migration destination) in replacing storage apparatuses, for example.

For data migration, there is known a technique of continuing input/output (I/O, input and output of data) to and from a host computer (hereinafter referred to as "host"), counting the frequency of access to individual disks, and executing data migration preferentially from an area with high access frequency.

For a storage system, there is known a technique of evaluating the access states of sub-blocks obtained by dividing a logical unit number (LUN) by data migration unit and giving higher priority to data transfer of highly evaluated sub-blocks. Example related art documents include Japanese Laid-open Patent Publication No. 2000-187608 and Japanese Laid-open Patent Publication No. 2014-232348.

SUMMARY

According to an aspect of the invention, a control apparatus configured to control a first storage apparatus, the control apparatus includes a memory, and a processor coupled to the memory and configured to determine a first value indicating a resource amount of the first storage apparatus, determine, respectively for a plurality of logical volumes included in the first storage apparatus, a load of the first storage apparatus due to access from an information processing apparatus to the first storage apparatus, determine a priority of the plurality of logical volumes, respectively, for a process of data migration from a second storage apparatus to the first storage apparatus based on the load determined respectively for the plurality of logical volumes, determine a second value indicating a resource amount of the first storage apparatus which is used in the access from the information processing apparatus to the first storage apparatus, calculate, as a migration resource amount of the first storage apparatus, a value by subtracting the second value from the first value, the migration resource amount being useable in the process of data migration, allocate the migration resource amount to the plurality of logical volumes based on the priority respectively determined for the plurality of logical volumes, and execute the process of data migration for the plurality of logical volumes based on the migration resource amount allocated to the plurality of logical volumes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of an access counter table of the second embodiment;

FIG. 9 is a diagram illustrating an example of a point counter table of the second embodiment;

FIG. 10 is a diagram illustrating an example of a bitmap table of the second embodiment;

DESCRIPTION OF EMBODIMENTS

A storage control unit of the data migration destination is capable of processing host I/O, if the host I/O is I/O to an area to which data has been migrated, by accessing a storage provided in the storage control unit (a storage apparatus of the data migration destination). If the host I/O is I/O to an area to which data is not migrated, the storage control unit of the data migration destination process the host I/O by accessing data in a storage of a storage apparatus of the data migration source. This is a cause of delay in host I/O. Furthermore, data migration has the characteristics that giving a high priority to host I/O delays data migration, and giving a high priority to data migration delays host I/O.

First Embodiment

Figure 1:
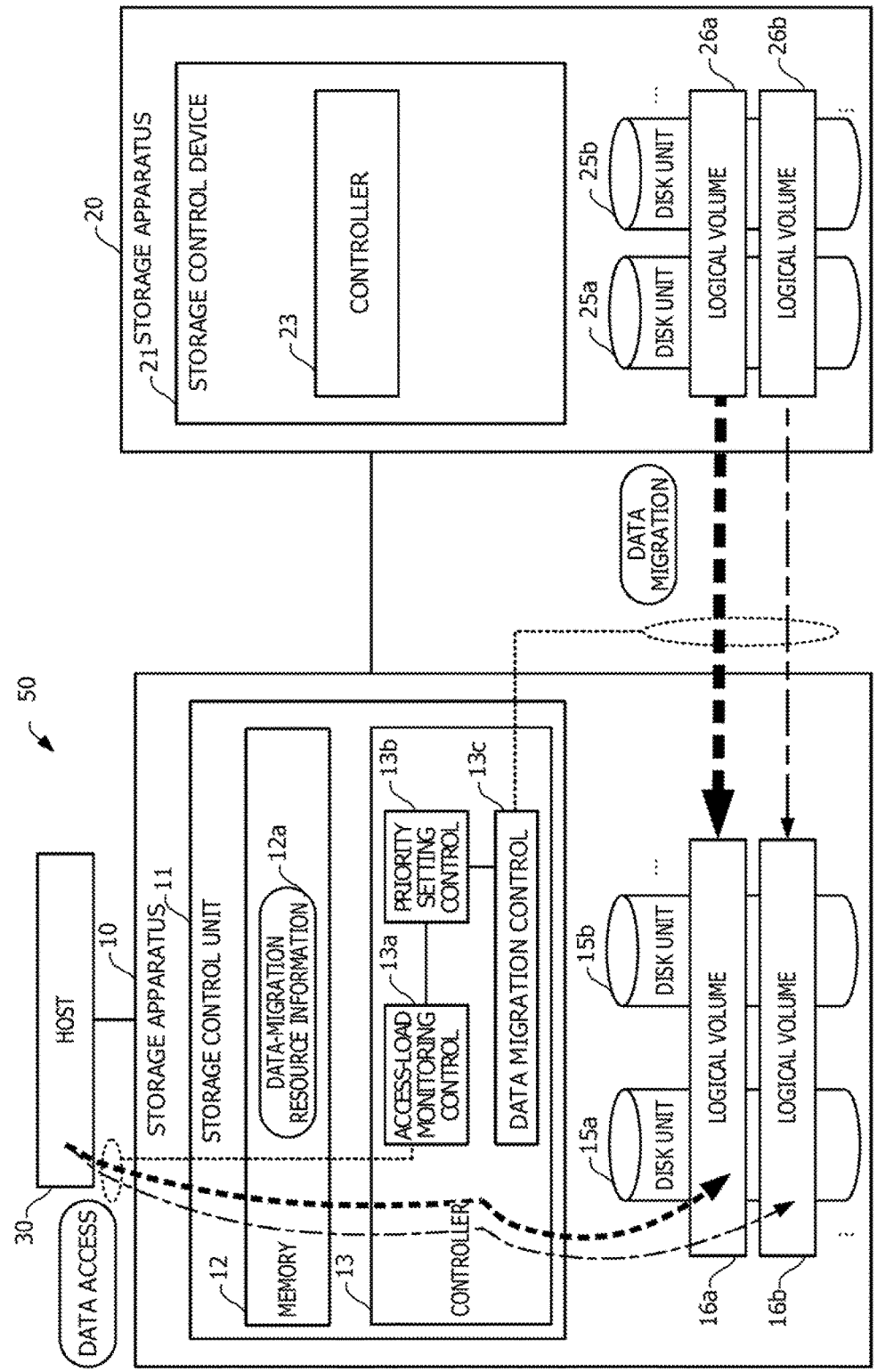
FIG. 1 is a diagram illustrating an example of the configuration of a storage system of a first embodiment.

First, a storage system according to a first embodiment will be described with reference to FIG. 1. FIG. 1 is a diagram illustrating an example of the configuration of a storage system 50 of the first embodiment.

The storage system 50 includes a plurality of storage apparatuses 10 and 20. The storage system 50 is capable of migrating data, that is, data migration from the storage apparatus 20 to the storage apparatus 10. The storage apparatus 10 is a storage apparatus of the data migration destination in the data migration. The storage apparatus 20 is a storage apparatus of the data migration source in the data migration. An example of the storage apparatuses 10 and 20 is a redundant arrays of independent disks (RAID) apparatus.

The storage apparatus 10 includes a storage control unit 11 and one or more disk units 15a, 15b, . . . capable of storing data. The storage control unit 11 controls the storage apparatus 10. The storage control unit 11 is one of information processing units, for example, a controller module. In data migration to migrate data to the disk units 15a, 15b, . . . of the storage apparatus 10, the storage control unit 11 controls data migration from the storage apparatus 10. The storage control unit 11 includes a memory 12 and a controller 13.

The memory 12 stores data-migration resource information 12a. The data-migration resource information 12a is information specifying the amount of resources that the storage apparatus 10 can use for data migration. The resources specified from the data-migration resource information 12a include hardware resources, software resources, and a network band for use in input and output of data between the storage apparatus 10 and the host 30 and between the storage apparatuses 10 and 20. The software resources include a data input/output amount per predetermined unit. Examples of the predetermined unit include a unit time and a data migration request and response cycle. Examples of the data input/output amount include the number of inputs/outputs, a written data amount, a read data amount, and the number of data transfer blocks. An example of the amount of resources that the storage apparatus 10 can use for data migration is a maximum value of a data amount that the storage apparatus 10 can input and output.

The controller 13 performs access-load monitoring control 13a, priority setting control 13b, and data migration control 13c. The access-load monitoring control 13a is control to monitor an access load from the host 30 on the storage apparatus 10 of the data migration destination in units of the logical volumes 16a, 16b, . . . . The priority setting control 13b is control to set priority for data migration for each logical volume based on the access load. The access load is a load imposed by data access from the host 30 to the storage apparatus 10. Examples of the access load include the number of inputs/outputs from the host 30 to the storage apparatus 10, the amount of data written from the host 30 to the storage apparatus 10, and the amount of data read from the host 30 to the storage apparatus 10. The logical volume 16a is a logical volume bearing the highest access load, and the other logical volumes 16b, . . . are logical volumes bearing lower access load.

The data migration control 13c is control to distribute the resource amount for use in data migration based on the priority set for each logical volume to execute data migration of each logical volume. Specifically, the data migration control 13c is control to ensure a resource amount for use according to access from the host 30 to the storage apparatus 10 from the resource amount specified from the data-migration resource information 12a and set the remainder as a resource amount that can be distributed for data migration. Examples of the resources for use according to access from the host 30 to the storage apparatus 10 of the data migration destination include a hardware resource, a software resource, and a network band for use in input/output of data between the host 30 and the storage apparatus 10. An example of the resource amount for use according to access from the host 30 to the storage apparatus 10 is an average value of input/output possible data amounts between the host 30 and the storage apparatus 10.

The one or more logical volumes 16a, 16b, . . . are set in the disk units 15a, 15b, . . . . The logical volumes 16a, 16b, . . . may be set across the plurality of disk units 15a, 15b, . . . .

The storage apparatus 20 includes a storage control unit 21 and one or more disk units 25a, 25b, . . . capable of storing data. The storage control unit 21 is one of information processing units, for example, a controller module. The storage control unit 21 includes a controller 23. The controller 23 receives a data read request from the storage apparatus 10 of the data migration destination and transmits the data requested for reading from the storage apparatus 20 of the data migration source to the storage apparatus 10 of the data migration destination. One or more logical volumes 26a, 26b, . . . are set in the disk units 25a, 25b, . . . . The logical volumes 26a, 26b, . . . may be set across the plurality of disk units 25a, 25b, . . . .

The process of the storage apparatus 10 receiving data access from the host 30 during execution of data migration will be described. The host 30 transmits a data access request to the storage apparatus 10. If the data to be accessed from the host 30 is migrated data, the controller 13 accesses data stored in the logical volumes 16a, 16b, . . . in response to the data access request from the host 30. If the data to be accessed from the host 30 is unmigrated data, the controller 13 requests the data from the storage apparatus 20 to acquire the data from the storage apparatus 20 in response to the data access request from the host 30. For that reason, when the controller 13 receives an access request for unmigrated data from the host 30, the response to the host 30 is later than the response for the migrated data.

The controller 13 monitors access load, which is generated by a data access request from the host 30 to the storage apparatus 10 in units of logical volumes 16a, 16b, . . . (access-load monitoring control 13a). The controller 13 sets priorities to the logical volumes 16a, 16b, . . . according to the access load (priority setting control 13b). The priorities are values that are changed according to the access load. The priorities may be represented by numerical values, symbols (rank A, rank B, rank C, etc.), or the like.

The controller 13 distributes a resource amount that can be distributed for data migration of the resource amount specified from the data-migration resource information 12a according to the priorities set to the logical volumes 16a, 16b, . . . to execute data migration (data migration control 13c). For example, when a priority higher than those of logical volumes 16b, . . . are set to the logical volume 16a, the controller 13 assigns a larger input/output amount to data migration to the logical volume 16a than those to the logical volumes 16b, . . . and executes data migration. More specifically, the controller 13 sets a larger data amount for a read request (read command) for data migration of the logical volume 16a than for data migration of the other logical volumes 16b, . . . and transmits the read request to the storage apparatus 20. The controller 13 receives data from the storage apparatus 20 as a response to the read request and writes the received data to the logical volume 16a to execute data migration.

Thus, the storage apparatus 10 secures resources for use in data input/output with the host 30 in advance and distributes the remainder to the plurality of logical volumes 16a, 16b, . . . for data migration to execute data migration. In other words, the storage apparatus 10 can execute data migration, with a higher priority given to a logical volume in which data with high probability of being accessed from the host 30 is stored, while securing a resource amount desired for access from the host 30. The storage apparatus 10 preferentially migrates data with high probability of being accessed from the host 30 to thereby reduce access to unmigrated data from the host 30, thereby decreasing delay in response to the host 30.

This allows the storage control unit 11 to reduce delay in data access between the host 30 and the storage apparatus 10 while balancing data access between the host 30 and the storage apparatus 10 and data migration between the storage apparatuses 10 and 20.

Second Embodiment

Figure 2:
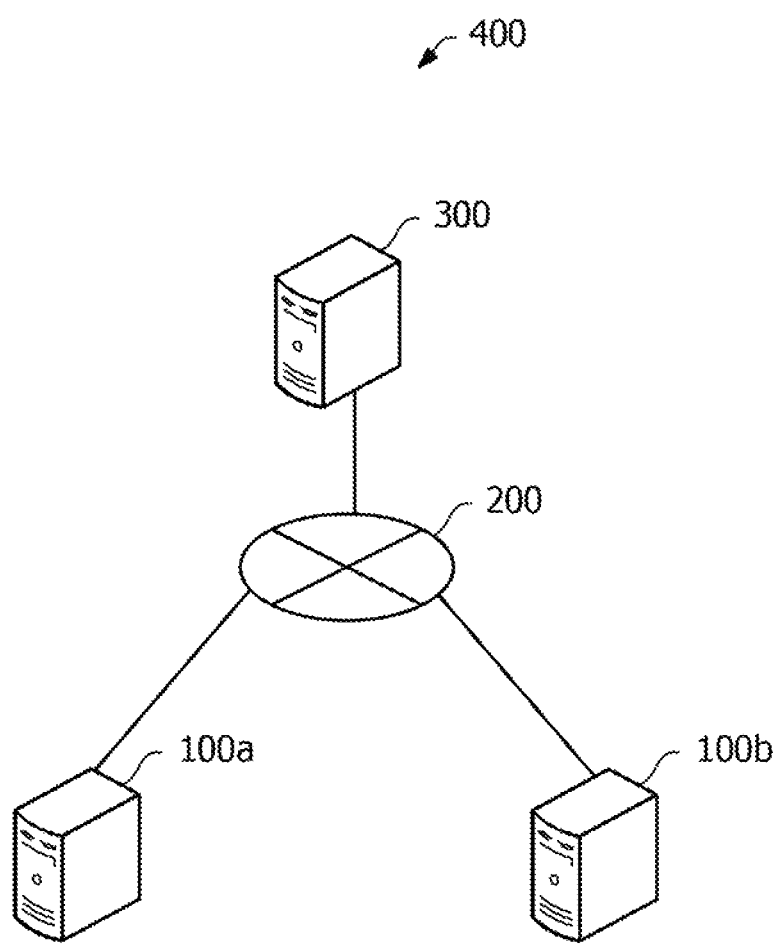
FIG. 2 is a diagram illustrating an example of the configuration of a storage system of a second embodiment.

Next, a storage system according to a second embodiment will be described. FIG. 2 is a diagram illustrating an example of the configuration of a storage system 400 of the second embodiment.

The storage system 400 includes a host 300 and storage apparatuses 100a and 100b coupled to the host 300 via a network 200. The storage system 400 executes data migration with one of the storage apparatuses 100a and 100b as a storage apparatus of a data migration destination and the other as a storage apparatus of the data migration source. For example, the storage system 400 performs data migration with the storage apparatus 100a as a data migration destination and the storage apparatus 100b as a data migration source.

Execution of data migration is controlled by the storage apparatus 100a of the data migration destination. Instead of the storage apparatus 100a of the data migration destination, the host 300 may control the data migration.

The storage apparatuses 100a and 100b control input/output (I/O) to/from storages provided in the storage apparatuses 100a and 100b in response to a data input/output (I/O) request from the host 300. If the storage apparatuses 100a and 100b are RAID apparatuses, their RAID levels may be RAID 0+1, RAID 5, RAID 6, or other levels.

Commands to request I/O that the host 300 and the storage apparatuses 100a and 100b transmit and receive are defined by, for example, small computer system interface (SCSI) architecture model (SAM), SCSI primary commands (SPC), or SCSI block commands (SBC). Information on the commands are described in, for example, command description block (CDB). Examples of the commands on I/O of data includes a read command and a write command. The commands may contain LUN and logical block address (LBA) in which data to be migrated (migration target data) is stored and the number of blocks of the migration target data.

Figure 3:
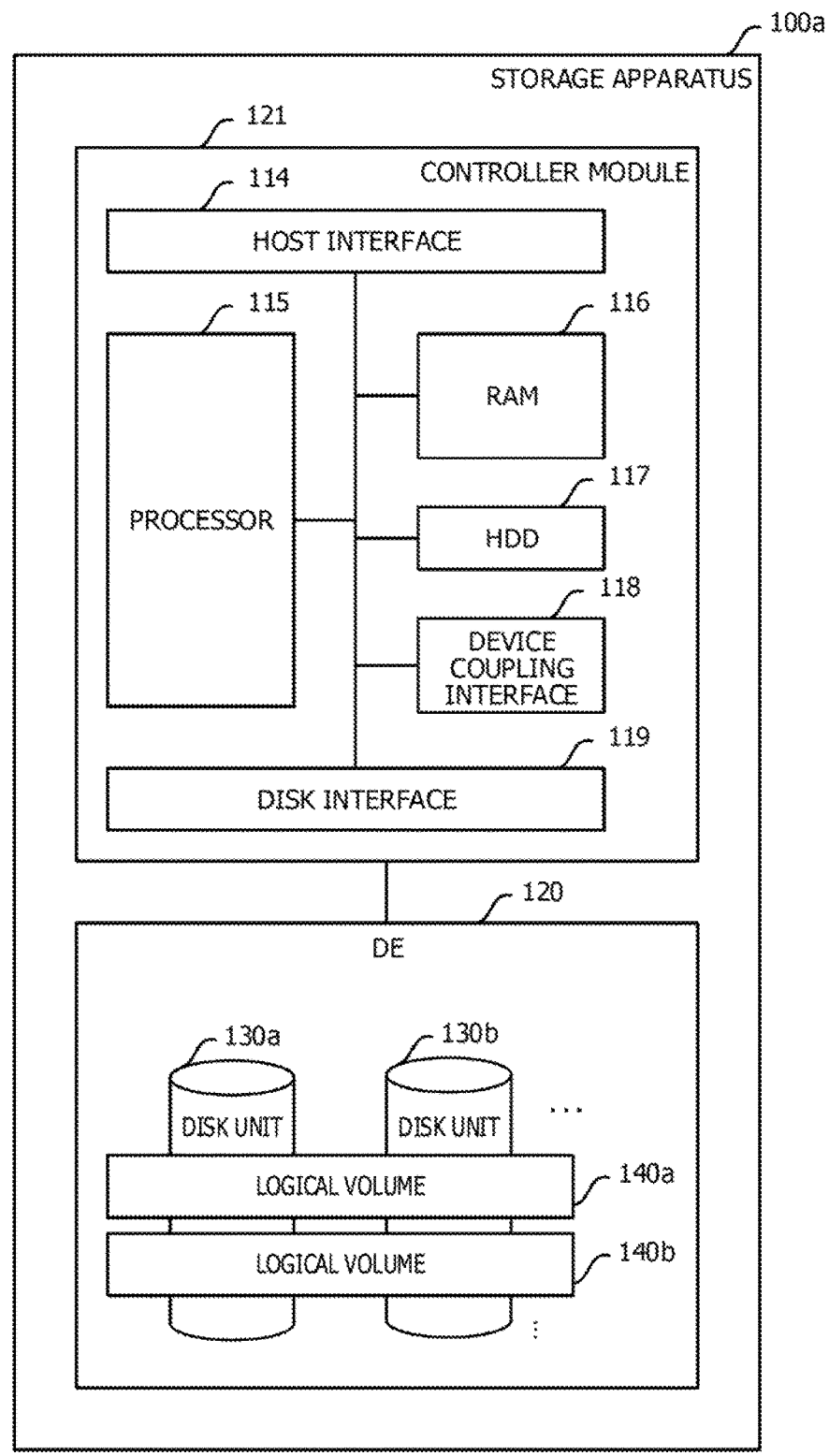
FIG. 3 is a diagram illustrating an example of the hardware configuration of a storage apparatus of the second embodiment.

Next, the hardware configuration of the storage apparatus 100a will be described with reference to FIG. 3. FIG. 3 is a diagram illustrating an example of the hardware configuration of the storage apparatus 100a of the second embodiment.

The storage apparatus 100a includes a controller module 121 and a disk enclosure (DE) 120. The storage apparatus 100a may include a plurality of controller modules 121 and a plurality of DEs 120. The storage apparatus 100b can also be implemented by similar hardware.

The controller module 121 includes a host interface 114, a processor 115, a random access memory (RAM) 116, a hard disk drive (HDD) 117, a device coupling interface 118, and a disk interface 119.

The overall controller module 121 is controlled by the processor 115. A plurality of peripheral devices and the RAM 116 are coupled to the processor 115 via a bus. The processor 115 may be a multicore processor including two or more processors. If the storage apparatus 100a includes a plurality of controller modules 121, the master-subordinate relationship of the controller modules 121 may be specified, and the processor 115 of a master controller module 121 may control the subordinate controller module 121 and the entire storage apparatus 100a.

Examples of the processor 115 include a central processing unit (CPU), micro processing unit (MPU), a digital signal processor (DSP), an application specific integrated circuit (ASIC), and a programmable logic device (PLD).

The RAM 116 is used as a main storage of the controller module 121. The RAM 116 temporarily stores at least part of programs of an operating system (OS) and application programs to be executed by the processor 115. The RAM 116 stores various data desired for processing performed by the processor 115. The RAM 116 functions as a cache memory of the processor 115.

Examples of the peripheral devices coupled with the bus include the host interface 114, the HDD 117, the device coupling interface 118, and the disk interface 119. The host interface 114 performs transmission and reception of data with the host 300 via the network 200.

The HDD 117 magnetically writes and reads data to and from a built-in disk medium. The HDD 117 is used as an auxiliary storage of the storage apparatus 100a. The HDD 117 stores the programs of the OS, application programs, and various data. An example of the auxiliary storage is a semiconductor storage, such as a flash memory.

The device coupling interface 118 is a communication interface for coupling peripheral devices to the controller module 121. For example, the device coupling interface 118 may be coupled to a memory device or a memory reader/writer (not illustrated). The memory device is a recording medium equipped with a function of communication with the device coupling interface 118. The memory reader/writer is a device that writes data to a memory card or reads data from a memory card. An example of the memory card is a card-type recording medium.

The device coupling interface 118 may be coupled to a display unit (not illustrated). In that case, the device coupling interface 118 has the function of displaying information on the display unit according a command from the processor 115.

The device coupling interface 118 may be coupled to a keyboard or a mouse (not illustrated). In that case, the device coupling interface 118 transmits a signal transmitted from the keyboard or the mouse to the processor 115. The mouse is an example of a pointing device. Another pointing device may be used. Examples of another pointing device include a touch panel, a tablet, a touch pad, and a trackball.

The device coupling interface 118 may be coupled to an optical drive unit (not illustrated). The optical drive unit reads data recorded on an optical disc using a laser beam or the like. The optical disc is a portable recording medium on which data is readably recorded due to reflection of light. Examples of the optical disc include a digital versatile disc (DVD), a DVD-RAM, a compact-disc read-only memory (CD-ROM), and a CD-recordable/rewritable (R/RW). The disk interface 119 transmits and receives data to and from the DE 120. The controller module 121 is coupled to the DE 120 via the disk interface 119.

The DE 120 includes one or more disk units 130a, 130b, . . . in which data is stored according an instruction from the controller module 121. The disk units 130a, 130b, . . . are storages, for example, HDDs or solid state drives (SSDs).

One or more logical volumes 140a, 140b, . . . are set in the disk units 130a, 130b, . . . . The logical volumes 140a, 140*b*, . . . may be set across the plurality of disk units 130*a*, 130*b*, . . . . The data stored in the disk units 130*a*, 130*b*, . . . can be specified by address information, such as LUN and LBA.

With the above hardware configuration, the processing function of the storage apparatus 100*a* can be implemented.

The storage apparatus 100*a* implements the processing function of the storage apparatus 100*a* by executing programs recorded on a computer-readable recording medium, for example. The programs describing processing details to be executed by the storage apparatus 100*a* can be recorded on various recording media. For example, the programs to be executed by the storage apparatus 100*a* may be stored in the HDD 117. The processor 115 loads at least part of the programs in the HDD 117 to the RAM 116 to execute the programs. The programs to be executed by the storage apparatus 100*a* may be recorded on a portable recording medium, such as an optical disc, a memory device, or a memory card. The programs stored in the portable recording medium are installed in the HDD 117, for example, under the control of the processor 115 and can be executed thereafter. The processor 115 can directly read the programs from the portable recording medium for execution.

Figure 4:
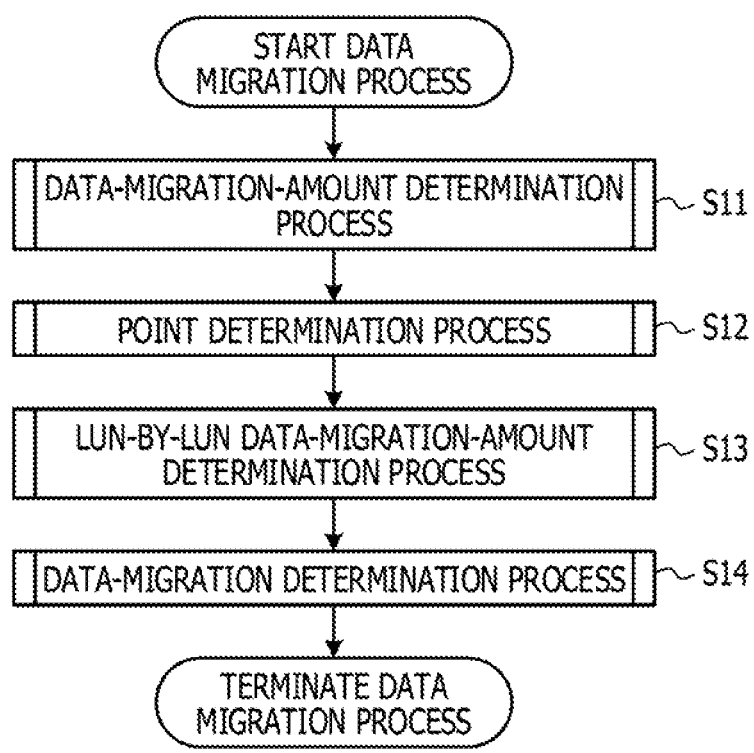
FIG. 4 is a diagram illustrating a flowchart of a data migration process of the second embodiment.

Next, a data migration process of the second embodiment will be described with reference to FIG. 4. FIG. 4 is a diagram illustrating a flowchart of the data migration process of the second embodiment.

The data migration process is a process in which the storage apparatus 100*a* of the data migration destination controls data migration. The storage apparatus 100*a* reads data from the storage apparatus 100*b* of the data migration source and writes the data to the disk units 130*a*, 130*b*, . . . provided in the storage apparatus 100*a* to migrate the data. The controller (the processor 115) of the storage apparatus 100*a* of the data migration destination receives an instruction to execute data migration from a system administrator and executes the data migration process.

[Step S11] The controller executes a data-migration-amount determination process. The data-migration-amount determination process is a process in which the storage apparatus 100*a* of the data migration destination determines the total amount of data transmitted from the storage apparatus 100*b* of the data migration source. The details of the data-migration-amount determination process will be described later with reference to FIG. 5.

[Step S12] The controller executes a point determination process. The point determination process is a process of determining the value of the point (priority) of each LUN according to the number of accesses from the host 300 to the storage. The details of the point determination process will be described later with reference to FIG. 8.

The controller determines the amount of data to be migrated and the priority to perform data migration for each target LUN according to the value of the point. The details of the process in which the controller determines the amount of data to be migrated for each target LUN according to the value of the point will be described later with reference to FIG. 11. The details of the process in which the controller determines the priority to perform data migration for each target LUN according to the value of the point will be described later with reference to FIG. 12.

[Step S13] The controller executes a LUN-by-LUN data-migration-amount determination process. The LUN-by-LUN data-migration-amount determination process is a process of determining the amount of data to be migrated according to a point give for each LUN. The details of the LUN-by-LUN data-migration-amount determination process will be described later with reference to FIG. 11.

[Step S14] The controller executes a data-migration determination process. The data-migration determination process is a process of determining data migration target areas according I/O from the host 300 for data migration. The details of the data-migration determination process will be described later with reference to FIG. 12.

Figure 5:
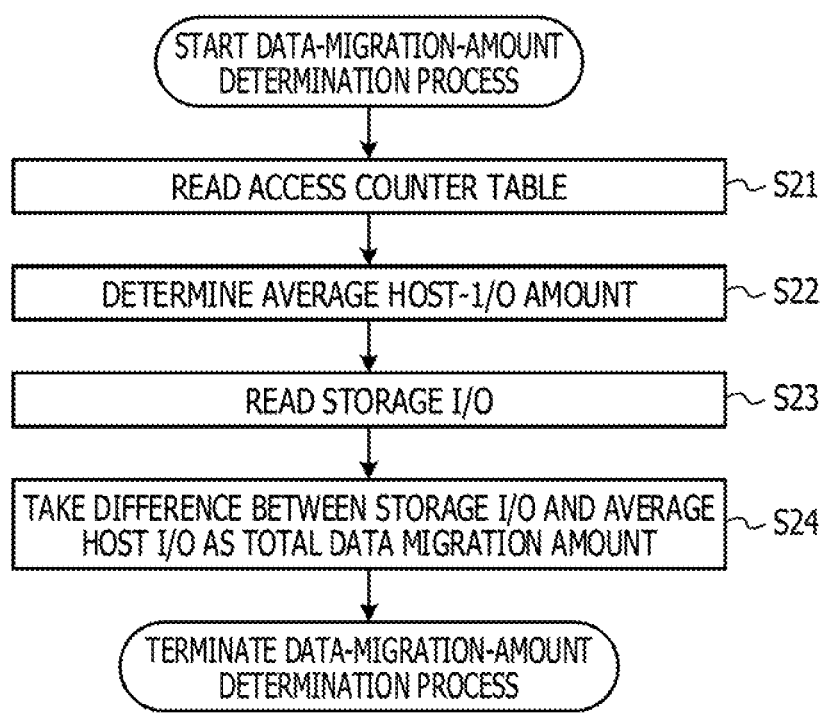
FIG. 5 is a diagram illustrating a flowchart of a data-migration-amount determination process of the second embodiment.

Next, the data-migration-amount determination process will be described with reference to FIG. 5. FIG. 5 is a diagram illustrating a flowchart of the data-migration-amount determination process of the second embodiment.

The data-migration-amount determination process is a process in which the controller (the processor 115) of the storage apparatus 100*a* of the data migration destination determines the total amount of data to be transmitted from the storage apparatus 100*b* of the data migration source. The data-migration-amount determination process is a process that the controller executes at step S11 in the data migration process.

[Step S21] The controller reads an access counter table to acquire the number of accesses from the host 300 to the storage apparatus 100*a*. The access counter table will be described later with reference to FIG. 6.

[Step S22] The controller determines an average host I/O amount. In other words, the controller acquires a value obtained by totaling all access counts per LUN acquired from the access counter table as the average host I/O.

[Step S23] The controller reads a storage I/O amount. In other words, the controller reads the I/O performance value of the storage apparatus 100*a* stored in advance in the memory of the storage apparatus 100*a*. The I/O performance value of the storage apparatus 100*a* is the maximum amount of I/O that the storage apparatus 100*a* can execute and includes the amount of I/O to and from the host 300 and an I/O amount between the storage apparatuses 100*a* and 100*b*.

[Step S24] The controller takes the difference between the storage I/O amount and the average host I/O amount as a total data migration amount.

Thus, the controller takes the difference between the storage I/O amount and the average host I/O amount as an I/O amount for use in data migration between the storage apparatuses 100*a* and 100*b*, thereby securing the average host I/O to reduce excess delay in the host I/O.

The above process is merely an example; the I/O amount (in other words, the amount of data that can be input and output) may be any of the number of inputs/outputs per unit time, the amount of data written per unit time, the amount of data read per unit time, and the number of blocks to which data is transferred per unit time, or a combination thereof.

Next, the access counter table will be described with reference to FIG. 6. FIG. 6 is a diagram illustrating an example of an access counter table 500 of the second embodiment.

The access counter table 500 is information for counting how many times access from the host 300 for I/O is made to each LBA of the storage of the storage apparatus 100*a* in a predetermined time for each LBA of each LUN. The access counter table 500 is information stored in a memory of the storage apparatus 100*a*, such as the HDD 117.

The access counter table 500 stores the number of accesses per LBA for each LUN. The access counter table 500 also stores the number of accesses per LUN as access count per LUN. The initial value of the access counter table 500 is zero for all the number of accesses. Referring to FIG.

7, an access-counter-table update process for storing the number of accesses in the access counter table 500 will be described.

Figure 7:
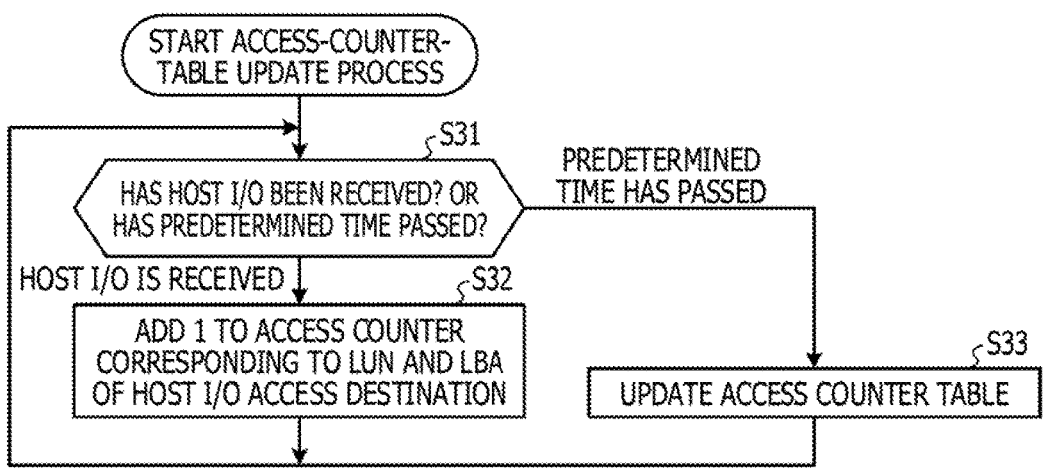
FIG. 7 is a diagram illustrating a flowchart of an access-counter-table update process of the second embodiment.

Next, the access-counter-table update process will be described with reference to FIG. 7. FIG. 7 is a diagram illustrating a flowchart for the access-counter-table update process of the second embodiment.

The access-counter-table update process is a process in which the controller (the processor 115) of the storage apparatus 100*a* stores the number of accesses in the access counter table 500. The controller (the processor 115) of the storage apparatus 100*a* of the data migration destination receives an instruction to execute data migration from the system administrator and executes the access-counter-table update process on the background of the data migration process.

[Step S31] The controller determines whether I/O is received from the host 300 or whether a predetermined time (for example, three minutes) has passed. If I/O is received from the host 300, then the controller goes to step S32, and if a predetermined has passed, the controller goes to step S33.

The I/O from the host 300 contains a request to write data that the host 300 transmits to the storage apparatus 100*a* and a request to read the data.

[Step S32] The controller adds one to the value of the access counter corresponding to LUN and LBA of the I/O access destination of the host 300 and returns to step S31.

[Step S33] The controller updates the access counter table 500. In other words, when the number of accesses per predetermined time (for example, three minutes) is acquired, the controller stores the access counter table 500 at predetermined time intervals in the memory.

The controller may store the access counter table 500 in the memory at predetermined time intervals, clear the access counter table 500 at predetermined time intervals, or store the number of accesses at predetermined time intervals using another method.

Figure 8:
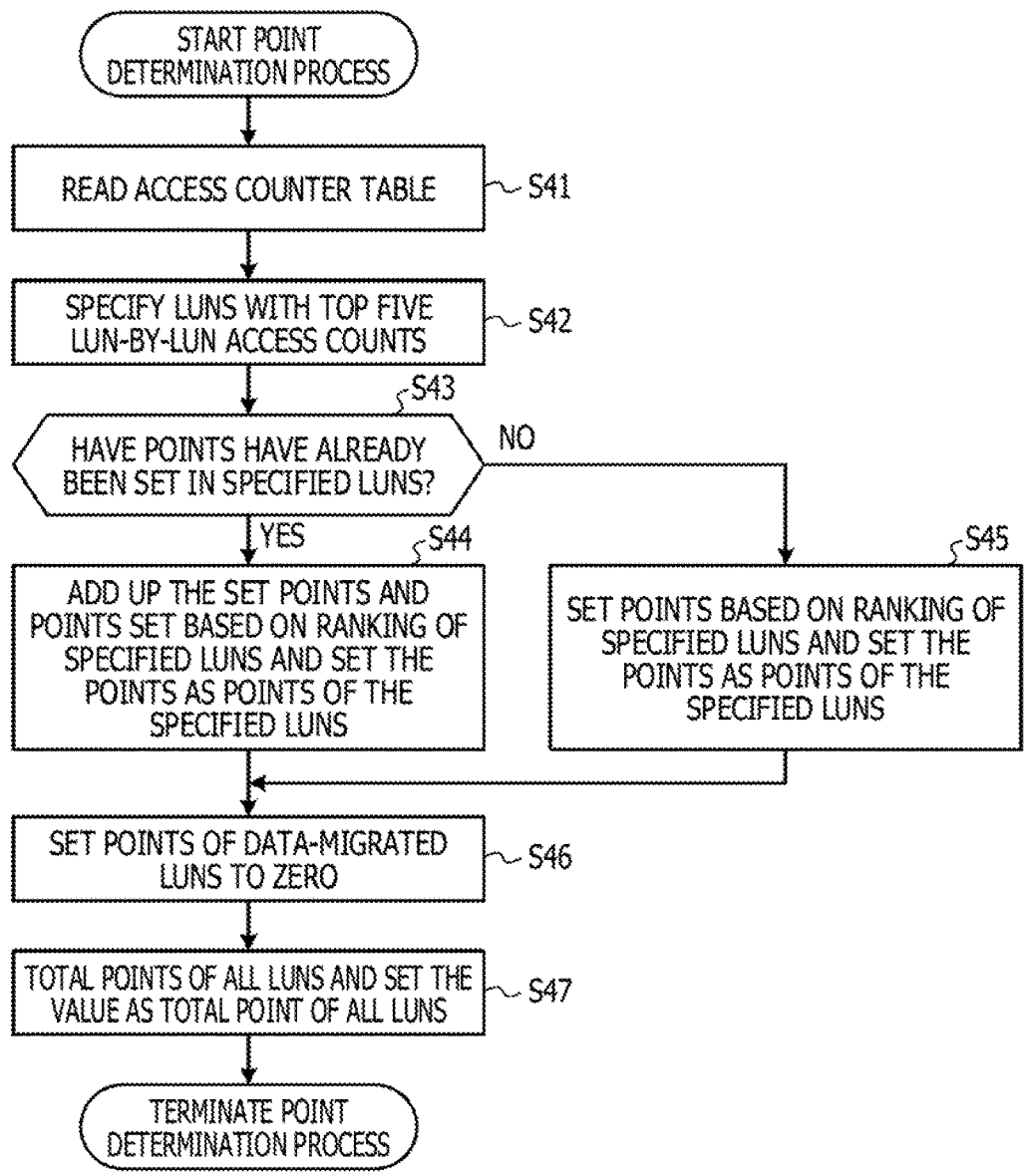
FIG. 8 is a diagram illustrating a flowchart of a point determination process of the second embodiment.

Next, the point determination process will be described with reference to FIG. 8. FIG. 8 is a diagram illustrating a flowchart of the point determination process of the second embodiment.

The point determination process is a process of determining the value of the point (priority) of each LUN according to the number of accesses from the host 300 to the storage. The point determination process is a process that the controller executes at step S12 of the data migration process.

[Step S41] The controller reads the access counter table 500.

[Step S42] The controller specifies LUNs with top five access counts based on the access counter table 500 read at step S41.

For example, LUNs with top five LUN-by-LUN access counts in the access counter table 500 are specified as LUN 0, LUN1, LUN n, LUN 3, and LUN 2 in this order from the first place.

[Step S43] The controller determines whether a point has already been set for each specified LUN based on a point counter table. If points have already been set for the specified LUNs, the controller goes to step S44. If points are not set, in other words, if the points are "zero", the controller goes to step S45.

The point counter table will be described with reference to FIG. 9. FIG. 9 is a diagram illustrating an example of a point counter table 510 of the second embodiment.

The point counter table 510 is information for counting a point given to each LUN in the storage of the storage apparatus 100*a*. The point counter table 510 is information stored in a memory, such as the HDD 117, of the storage apparatus 100*a*.

The point counter table 510 is information containing information for identifying LUNs, points given to the LUNs, and a total point of all the LUNs. The points are information for use in assigning priorities to LUNs to which the storage apparatus 100*a* migrates data and distributing resources for use in data migration. The total point of all LUNs is the total value of points given to all the LUNs. The initial value of the point counter table 510 is zero for all the LUNs.

The flowchart of the point determination process will be described again.

[Step S44] The controller adds up the previously set points and points set based on the ranking of the number of accesses per specified LUN and sets the points as the points of the specified LUNs.

For example, the controller reads information from the memory, the information indicating that the first place of the number of accesses per LUN is assigned five points, the second place is assigned four points, the third place is assigned three points, the fourth place is assigned two points, and the fifth pace is assigned one point. If LUN 0, which is ranked first in access count per LUN, is the specified LUN, the controller stores nine points obtained by adding up four points, which has already been set for LUN 0 and five points, which are set based on the ranking of first place in the point counter table 510, as a point for LUN 0.

[Step S45] The controller sets points based on the ranking of the specified LUNs and set the points as the points of the specified LUNs.

For example, if LUN 3, which is ranked fourth in access count per LUN, is the specified LUN, the controller stores two points set based on the ranking of the fourth place in the point counter table 510 as a point for LUN 3.

[Step S46] The controller sets a point for a LUN to which data has been migrated to zero point. Specifically, the controller specifies LUNs n which data migration has been completed for all LBAs with reference to a bitmap table and sets the points of the specified LUNs to zero point.

The bitmap table will be described with reference to FIG. 10. FIG. 10 is a diagram illustrating an example of a bitmap table 520 according to the second embodiment.

The bitmap table 520 is information indicating whether data migration of the LUNs set in the disk units 130*a*, 130*b*, . . . of the storage apparatus 100*a* has been completed for each LBA. The bitmap table 520 is information stored in a memory, such as the HDD 117, of the storage apparatus 100*a*. The controller stores "1" when data migration of each LUN in the bitmap table 520 has been completed for each LBA and stores "0 (zero)" when data migration is incomplete. The controller can specify a LUN in which all the LBAs have point "1" as a LUN in which data migration is completed with reference to the bitmap table 520. The initial value of the bitmap table 520 is "0 (zero)" for each LBA of each LUN.

The flowchart of the point determination process will be described again.

[Step S47] The controller totals up the points of all the LUNs, stores the value in the point counter table 510 as a total point value of all the LUNs, and terminates the point determination process.

The above process is merely an example; the number of accesses may be a load that can be monitored in units of logical volumes 140*a*, 140*b*, . . . . The load may be any of the number of inputs/outputs from the host to the destination storage apparatus, the amount of written, the amount of read data, and a combination thereof and may contain other information.

Figure 11:
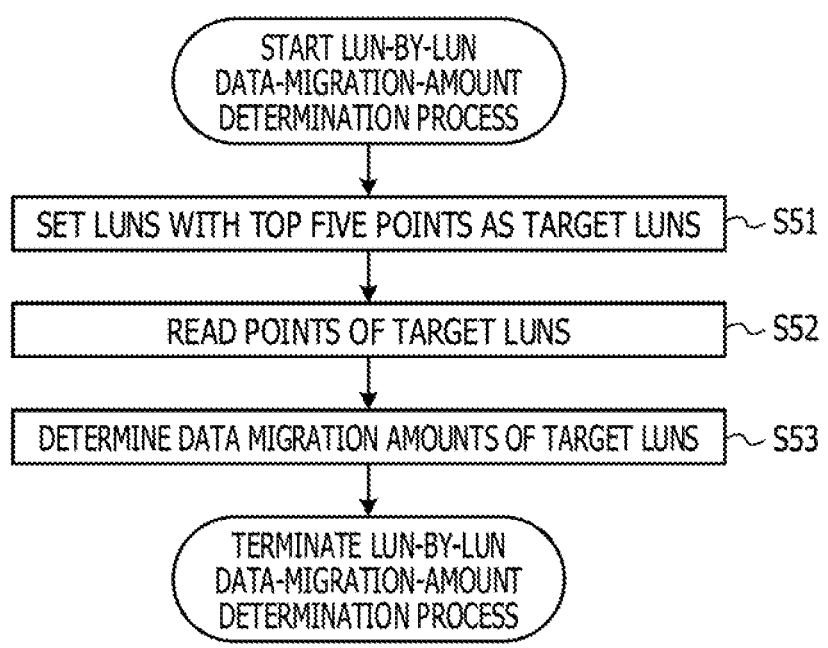
FIG. 11 is a diagram illustrating a flowchart of a LUN-by-LUN data-migration-amount determination process of the second embodiment.

Next, the LUN-by-LUN data-migration-amount determination process will be described with reference to FIG. 11. FIG. 11 is a diagram illustrating a flowchart of the LUN-by-LUN data-migration-amount determination process of the second embodiment.

The LUN-by-LUN data-migration-amount determination process is a process for determining the amount of data to be migrated according to a point given for each LUN. The LUN-by-LUN data-migration-amount determination process is a process that the controller executes at step S13 of the data migration process.

[Step S51] The controller sets LUNs with the top five points as the target LUNs based on the point counter table 510.

[Step S52] The controller reads the points of the target LUNs from the point counter table 510.

[Step S53] The controller determines the amounts of data migration of the target LUNs. The amounts of data migration of the target LUNs can be calculated using, for example, the following Eq. (1). For the total data migration amount, refer to step S24 in the data-migration-amount determination process.

Target LUN data migration amount=total data migration amount×(the point of target LUN÷the total point of LUNs)     (1)

In other words, the controller distributes the total data migration amount to each logical volume at the ratio of the point set in each logical volume to all of the points set in the logical volumes. For example, this will be described for a case where the target LUN is LUN 0. The controller can calculate the data migration amount of LUN 0 by "total data migration amount×(4÷20)" based on the point counter table 510 (point "4" set to LUN 0 and the total point "20" of all the LUNs).

Figure 12:
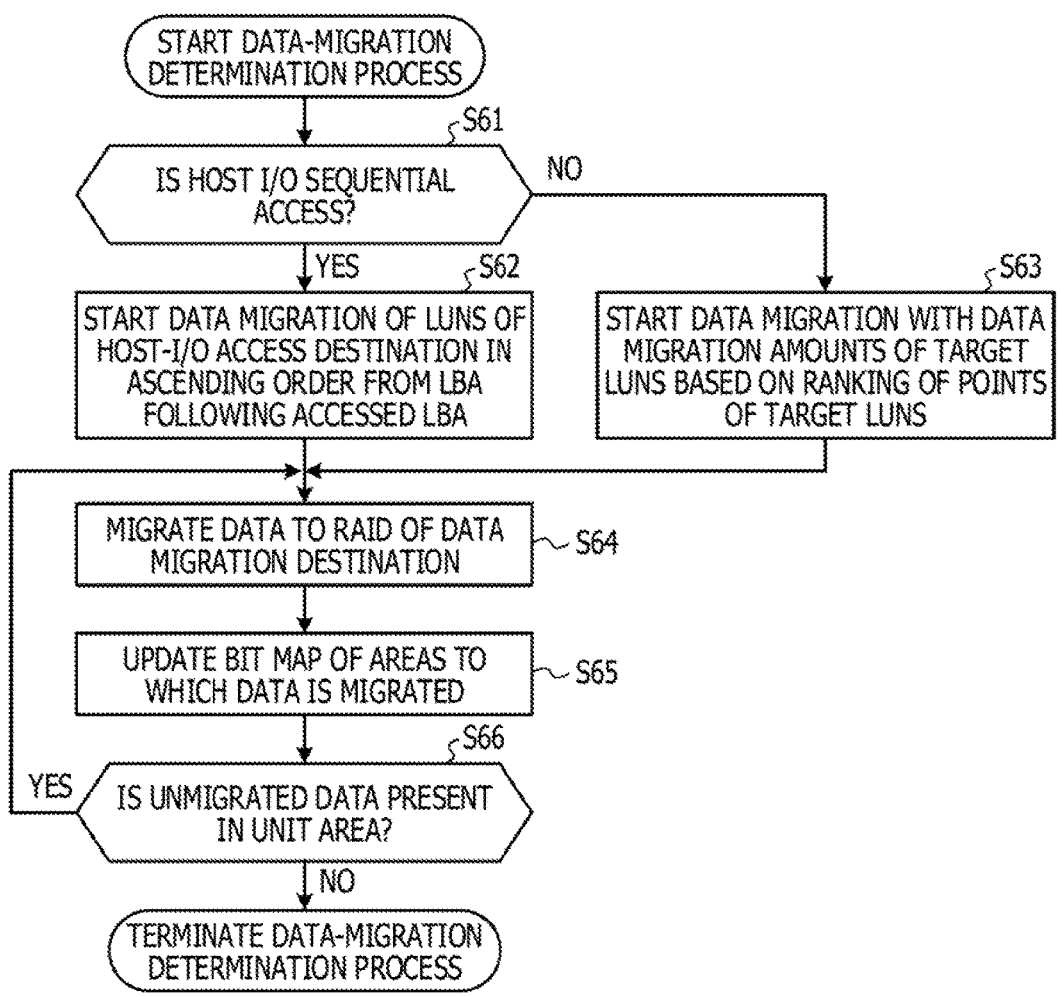
FIG. 12 is a diagram illustrating a flowchart of the data-migration determination process of the second embodiment.

Next, the data-migration determination process will be described with reference to FIG. 12. FIG. 12 is a diagram illustrating a flowchart of the data-migration determination process of the second embodiment.

The data-migration determination process is a process of determining a data migration area according to I/O from the host 300 and migrating the data. The data-migration determination process is a process that the controller executes at step S14 of the data migration process.

[Step S61] The controller determines whether I/O from the host 300 to the storage apparatus 100a is sequential access. If the I/O is sequential access, the controller goes to step S62, and if not, goes to step S63.

[Step S62] The controller starts data migration of the LUNs accessed from the host 300 from a LBA larger than an accessed LBA in ascending order.

Figure 13:
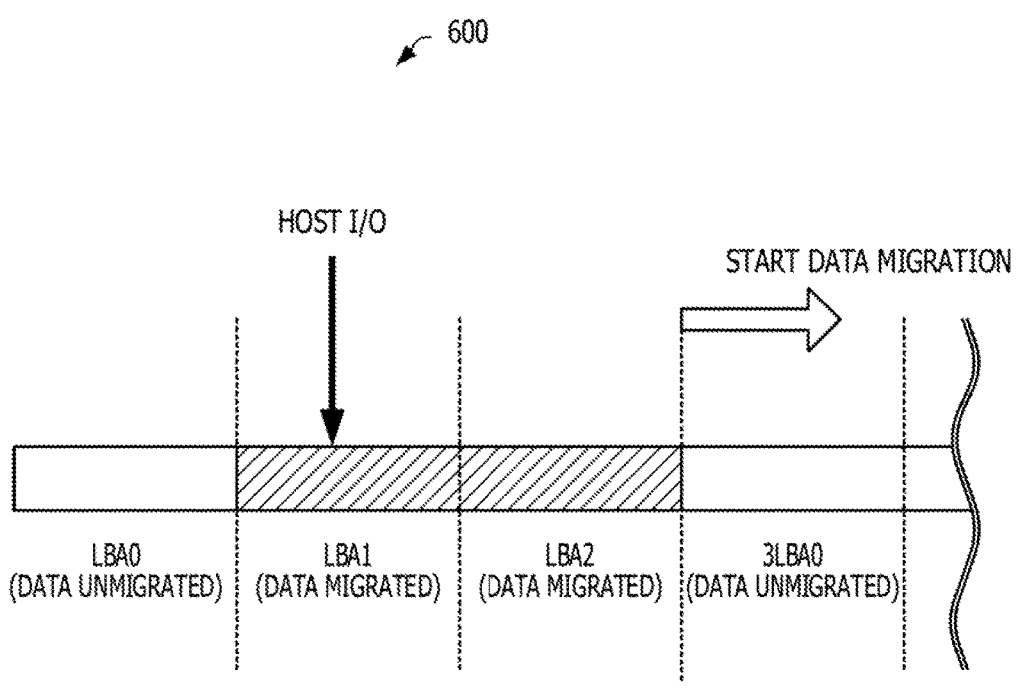
FIG. 13 is a diagram illustrating an example of a sequential-access data migration image of the second embodiment.

Here, data migration in the case where the I/O from the host 300 is sequential access will be described with reference to FIG. 13. FIG. 13 is a diagram illustrating an example of a sequential-access data migration image of the second embodiment.

The sequential-access data migration image 600 is an image of an area in which data migration is executed in the case where the I/O from the host 300 is sequential access. Here, a case where I/O access is made from the host 300 to LBA 1 of LUN 0 will be described. The controller specifies LBA 3 as an unmigrated area with an address larger than and closest to LBA 1 with reference to the bitmap table 520. The controller starts data migration from LBA 3 of LUN 0 and migrates data in ascending order of LBA 4, LBA 5, . . . . After completion of data migration from LBA 3 to LBA n, the controller migrates the data of LBA 0.

In other words, the controller migrates data to areas to which data has not yet been migrated in ascending order from an area with an address larger than the address of an area in which accessed data has been stored.

Thus, for sequential access, the controller can preferentially migrate the data of LBA larger than the LBA of the access destination as an area with high probability of being accessed from the host 300.

The flowchart of the data-migration determination process will be described again.

[Step S63] The controller starts data migration with the data migration amount of the target LUNs determined at step S53 based on the rank of the points of the target LUNs (the LUNs with the top five points).

Thus, the controller can preferentially migrate the data of LUNs with the top five points that will probably be accessed from the host 300. The controller can distribute data to be migrated for each target LUN based on the migration amounts determined at step S53.

[Step S64] The controller migrates the data from the storage apparatus 100b of the data migration source to the storage apparatus 100a of the data migration destination. The storage apparatus 100a migrates the data acquired from the storage apparatus 100b of the data migration source by storing the data in the disk units 130a, 130b, . . . provided in the storage apparatus 100a.

[Step S65] The controller updates the values of the areas to which data is migrated in the bitmap table 520.

[Step S66] The controller determines whether unmigrated data is present in the unit area based on the bitmap table 520. If an unmigrated area is present, the controller goes to step S64, and if not, terminates the data-migration determination process.

Here, in the case of sequential access, the unit area is a LUN accessed from the host 300. If it is not sequential access, the unit area is target LUNs (LUNs with the top first to fifth points).

The storage apparatus 100a of the data migration destination secures an average host I/O amount for host I/O and preferentially migrates data with high probability of being accessed from the host 300. This allows the storage apparatus 100a of the data migration destination to reduce excessive delay in host I/O while balancing the host I/O and I/O for data migration between the storage apparatuses 100a and 100b.

Thus, the storage system 400 can reduce excessive delay in host I/O during execution of data migration.

The above processing functions can be implemented by a computer. In that case, programs describing the processing details of the functions of the storage apparatus 10 and the storage apparatus 100a are provided. By the computer executing the programs, the processing functions are implemented on the computer. The programs describing the processing details can be recorded on a computer-readable recording medium. Examples of the computer-readable recording medium includes a magnetic storage, an optical disc, a magnetooptical recording medium, and a semiconductor memory. Examples of the magnetic storage include a hard disk drive (HDD), a flexible disk (FD), and a magnetic tape. Examples of the optical disc include a DVD, a DVD-RAM, and a CD-ROM/RW. An example of the magnetooptical recording medium is a magneto-optical disk (MO).

For distribution of the programs, a portable recording medium, such as a DVD or a CD-ROM, in which the programs are stored, is put on the market. The programs may be stored in a storage of a server computer, from which the programs may be transferred to another computer via a network.

A computer that executes programs, for example, a program stored in a portable recording medium or transferred from a server computer, stores the programs in its own storage. The computer reads the programs from its own storage and executes processes according to the programs. The computer can also directly read the programs from a portable recording medium and execute processes according to the programs. The computer can also execute processes according to programs received every time programs are transferred from a server computer coupled via a network.

At least part of the above processing functions can be implemented by an electronic circuit, such as a DSP, an ASIC, or a PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control apparatus configured to control a first storage apparatus, the control apparatus comprising:
   a memory; and
   a processor coupled to the memory and configured to:
      determine a first value indicating a resource amount of the first storage apparatus,
      determine, respectively for a plurality of logical volumes included in the first storage apparatus, a load of the first storage apparatus due to access from an information processing apparatus to the first storage apparatus,
      determine a priority of the plurality of logical volumes, respectively, for a process of data migration from a second storage apparatus to the first storage apparatus based on the load determined respectively for the plurality of logical volumes,
      determine a second value indicating a resource amount of the first storage apparatus which is used in the access from the information processing apparatus to the first storage apparatus,
      calculate, as a migration resource amount of the first storage apparatus, a value by subtracting the second value from the first value, the migration resource amount being useable in the process of data migration,
      allocate the migration resource amount to the plurality of logical volumes based on the priority respectively determined for the plurality of logical volumes, and
      execute the process of data migration for the plurality of logical volumes based on the migration resource amount allocated to the plurality of logical volumes.

2. The control apparatus according to claim 1,
   wherein the first value is a maximum value of an amount of data that is input to and output from the first storage apparatus, and
   wherein the second value is an average value of an amount of data exchanged between the information processing apparatus and the first storage apparatus.

3. The control apparatus according to claim 2,
   wherein the first value is determined based on one or more of frequency of inputs to the first storage apparatus per unit time, frequency of outputs from the first storage apparatus per unit time, an amount of data written to the first storage apparatus per unit time, an amount of data read from the first storage apparatus per unit time, a number of data blocks transmitted from the second storage apparatus to the first storage apparatus per unit time.

4. The control apparatus according to claim 1,
   wherein the load includes one or more of frequency of inputs and outputs between the information processing apparatus and the first storage apparatus, an amount of data written from the information processing apparatus to the first storage apparatus, and an amount of data read from the first storage apparatus to the information processing apparatus.

5. The control apparatus according to claim 1,
   wherein the processor is configured to
   set an evaluation value corresponding to the priority for the plurality of logical volumes, respectively, and
   allocate the migration resource amount to the plurality of logical volumes based on the evaluation value respectively set for the plurality of logical volumes.

6. The control apparatus according to claim 1, wherein the processor divides the migration resource amount among the plurality of logical volumes based on the priority determined respectively for the plurality of logical volumes.

7. The control apparatus according to claim 6, wherein the migration resource amount is varyingly allocated based on the priority determined respectively for the plurality of logical volumes.

8. The control apparatus according to claim 1, wherein the processor allocates a larger portion of the migration resource amount to a read request for one of the plurality of logical volumes than a read request for another one of the plurality of logical volumes.

9. A storage apparatus comprising:
   a memory; and
   a processor coupled to the memory and configured to:
      determine a first value indicating a resource amount of the first storage apparatus,
      determine, respectively for a plurality of logical volumes included in the storage apparatus, a load of the storage apparatus due to access from an information processing apparatus to the first storage apparatus,
      determine a priority of the plurality of logical volumes, respectively, for a process of data migration from another storage apparatus to the storage apparatus based on the load determined respectively for the plurality of logical volumes,
      determine a second value indicating a resource amount of the storage apparatus which is used in the access from the information processing apparatus to the storage apparatus,
      calculate, as a migration resource amount of the storage apparatus, a value by subtracting the second value from the first value, the migration resource amount being useable in the process of data migration,
      allocate the migration resource amount to the plurality of logical volumes based on the priority respectively determined for the plurality of logical volumes, and execute the process of data migration for the plurality of logical volumes based on the migration resource amount allocated to the plurality of logical volumes.

10. The storage apparatus according to claim 9,
wherein the first value is a maximum value of an amount of data that is input to and output from the storage apparatus, and
wherein the second value is an average value of an amount of data exchanged between the information processing apparatus and the storage apparatus.

11. The storage apparatus according to claim 10,
wherein the first value is determined based on one or more of frequency of inputs to the storage apparatus per unit time, frequency of outputs from the storage apparatus per unit time, an amount of data written to the storage apparatus per unit time, an amount of data read from the storage apparatus per unit time, a number of data blocks transmitted from the another storage apparatus to the storage apparatus per unit time.

12. The storage apparatus according to claim 9,
wherein the load includes one or more of frequency of inputs and outputs between the information processing apparatus and the storage apparatus, an amount of data written from the information processing apparatus to the storage apparatus, and an amount of data read from the storage apparatus to the information processing apparatus.

13. The storage apparatus according to claim 9,
wherein the processor is configured to
set an evaluation value corresponding to the priority for the plurality of logical volumes, respectively, and
allocate the migration resource amount to the plurality of logical volumes based on the evaluation value respectively set for the plurality of logical volumes.

14. The storage apparatus according to claim 9, wherein the processor divides the migration resource amount among the plurality of logical volumes based on the priority determined respectively for the plurality of logical volumes.

15. The storage apparatus according to claim 14, wherein the migration resource amount is varyingly allocated based on the priority determined respectively for the plurality of logical volumes.

16. The storage apparatus according to claim 9, wherein the processor allocates a larger portion of the migration resource amount to a read request for one of the plurality of logical volumes than a read request for another one of the plurality of logical volumes.

17. A method of data migration to a first storage apparatus from a second storage apparatus, the method comprising:
determining a first value indicating a resource amount of the first storage apparatus;
determining, respectively for a plurality of logical volumes included in the first storage apparatus, a load of the first storage apparatus due to access from an information processing apparatus to the first storage apparatus;
determining a priority of the plurality of logical volumes, respectively, for a process of data migration from a second storage apparatus to the first storage apparatus based on the load determined respectively for the plurality of logical volumes;
determining second value indicating a resource amount of the first storage apparatus which is used in the access from the information processing apparatus to the first storage apparatus;
calculating, as a migration resource amount of the first storage apparatus, a value by subtracting the second value from the first value, the migration resource amount calculated being useable in the process of data migration;
allocating the migration resource amount to the plurality of logical volumes based on the priority respectively determined for the plurality of logical volumes; and
executing the process of data migration for the plurality of logical volumes based on the migration resource amount allocated to the plurality of logical volumes.

18. The method according to claim 17,
wherein the first value is a maximum value of an amount of data that is input to and output from the first storage apparatus, and
wherein the second value is an average value of an amount of data exchanged between the information processing apparatus and the first storage apparatus.

19. The method according to claim 18,
wherein the first value is determined based on one or more of frequency of inputs to the first storage apparatus per unit time, frequency of outputs from the first storage apparatus per unit time, an amount of data written to the first storage apparatus per unit time, an amount of data read from the first storage apparatus per unit time, a number of data blocks transmitted from the second storage apparatus to the first storage apparatus per unit time.

20. The method according to claim 17,
wherein the load includes one or more of frequency of inputs and outputs between the information processing apparatus and the first storage apparatus, an amount of data written from the information processing apparatus to the first storage apparatus, and an amount of data read from the first storage apparatus to the information processing apparatus.

* * * * *